United States Patent
Shih et al.

(10) Patent No.: US 9,690,311 B2
(45) Date of Patent: Jun. 27, 2017

(54) POWER SUPPLY APPARATUS

(71) Applicant: FSP TECHNOLOGY INC., Taoyuan County (TW)

(72) Inventors: Yung-Hsiang Shih, Taoyuan County (TW); Kun-Feng Hsu, Taoyuan County (TW)

(73) Assignee: FSP TECHNOLOGY INC., Taoyuan (TW)

( * ) Notice: Subject to any disclaimer, the term of this patent is extended or adjusted under 35 U.S.C. 154(b) by 732 days.

(21) Appl. No.: 14/210,458

(22) Filed: Mar. 14, 2014

(65) Prior Publication Data

US 2014/0265575 A1 Sep. 18, 2014

Related U.S. Application Data

(60) Provisional application No. 61/786,185, filed on Mar. 14, 2013.

(51) Int. Cl.
*H05B 41/14* (2006.01)
*G05F 1/577* (2006.01)
(Continued)

(52) U.S. Cl.
CPC ............ *G05F 1/577* (2013.01); *G05B 13/02* (2013.01); *G05F 1/00* (2013.01); *G05F 3/30* (2013.01);
(Continued)

(58) Field of Classification Search
CPC G05B 13/02; G05F 1/00; G05F 1/577; H05B 33/0815; H05B 37/02; H02M 3/33507
USPC .............. 315/247, 307, 243, 209 R, 227 R; 700/37; 323/285, 299, 282, 283, 284; 363/15, 16, 74, 78, 79, 100
See application file for complete search history.

(56) References Cited

U.S. PATENT DOCUMENTS 5,012,125 A * 4/1991 Conway ................. H01B 9/028
                                                            174/120 SC
5,982,638 A * 11/1999 Tang .................... H02M 1/4258
                                                            363/16

FOREIGN PATENT DOCUMENTS

CN         1574580         4/2010

OTHER PUBLICATIONS

"Office Action of Taiwan Counterpart Application," issued on Mar. 10, 2015, p. 1-p. 8, in which the listed reference was cited.

* cited by examiner

*Primary Examiner* — Arnold Kinkead
(74) *Attorney, Agent, or Firm* — Jianq Chyun IP Office

(57) ABSTRACT

A power supply apparatus including a power conversion circuit, a single transformer, a conjugate energy-storing inductor and a first and a second rectifying and filtering circuit is provided. The single transformer has a primary winding, a first secondary winding and a second secondary winding. The primary winding is coupled to the power conversion circuit and the first and second secondary windings respectively induce a corresponding voltage based on a voltage of the primary winding. The conjugate energy-storing inductor has a first and a second conjugate coil isolated from each other. The first and second rectifying and filtering circuits respectively charges/discharges in response to the voltage induced by the first and second rectifying and filtering circuits, and thereby respectively provides a first and a second output voltage via the output terminals of the first and second rectifying and filtering circuits.

11 Claims, 2 Drawing Sheets

(51) Int. Cl.
*H05B 33/08* (2006.01)
*G05B 13/02* (2006.01)
*H02M 3/335* (2006.01)
*G05F 1/00* (2006.01)
*H05B 37/02* (2006.01)
*G05F 3/30* (2006.01)

(52) U.S. Cl.
CPC ... *H02M 3/33507* (2013.01); *H02M 3/33561* (2013.01); *H05B 33/0815* (2013.01); *H05B 37/02* (2013.01); *Y10T 307/406* (2015.04)

POWER SUPPLY APPARATUS

CROSS-REFERENCE TO RELATED APPLICATION

This application claims the priority benefits of U.S. provisional application Ser. No. 61/786,185, filed on Mar. 14, 2013. The entirety of the above-mentioned patent applications is hereby incorporated by reference herein and made a part of this specification.

FIELD OF THE INVENTION

The invention relates generally to a power conversion apparatus, and more particularly to a multi-output power conversion apparatus.

DESCRIPTION OF RELATED ART

In the designs of the conventional multi-output power supply apparatus, a plurality of transformers and feedback circuits are typically adopted to implement the multi-output power supply configuration. However, conventional designs usually have relatively high production costs and occupy a large space. Moreover, the power generation efficiency of the multi-output power supply apparatus is typically reduced because of the core loss which is generated by the multiple transformers. In addition, when the power supply apparatus is applied in electronic systems requiring long operational periods (e.g. surveillance systems), the internal temperature of the power supply apparatus tends to be too high due to the continual operation of the transformers, thus shortening the life span.

On the other hand, in the conventional multi-output power supply apparatus, during the switching of the light load and the heavy load, one of the output voltages is affected by the other one of the output voltages, and thereby voltage offset is generated. For example, under heavy loaded, the +12V output generates leakage inductance due to the short circuit caused by the current spike, and thereby drastically increasing the output voltage of the −53V output.

SUMMARY OF THE INVENTION

The invention provides a power supply apparatus capable of utilizing a single transformer and single feedback circuit configuration to implement a power supply mechanism with multiple voltage outputs.

A power supply apparatus includes a power conversion circuit, a single transformer, a conjugate energy-storing inductor, a first rectifying and filtering circuit and a second rectifying and filtering circuit. The single transformer has a primary winding, a first secondary winding, and a second secondary winding. The primary winding is coupled to the power conversion circuit, and the first and second secondary windings respectively induce a corresponding voltage based on a voltage of the primary winding. The conjugate energy-storing inductor has a first conjugate coil and a second conjugate coil isolated from each other, in which the first conjugate coil is coupled to the first secondary winding, and the second conjugate coil is coupled to the second secondary winding. The first and the second rectifying and filtering circuits are respectively coupled to the first and the second conjugate coils, in which the first and the second conjugate coils respectively charges and discharges in response to the voltage induced by the first and the second secondary windings, and thereby respectively provides a first output voltage and a second output voltage via the output terminals of the first and the second rectifying and filtering circuits.

According to an embodiment of the invention, at least one of the first and the second secondary windings and the conjugate energy-storing inductor is formed by winding an insulated wiring material.

According to an embodiment of the invention, the insulated wiring material is a triple insulated wire.

According to an embodiment of the invention, the first secondary winding and the first rectifying and filtering circuit use a voltage level of a first reference terminal as a first reference voltage level, and the second secondary winding and the second rectifying and filtering circuit use a voltage level of a second reference terminal as a second reference voltage level.

According to an embodiment of the invention, the power supply apparatus further includes an alternating current (AC) safety capacitor. The AC safety capacitor is coupled between the first reference terminal and the second reference terminal, in which the first reference terminal and the second reference terminal are electrically independent from each other in low frequency.

According to an embodiment of the invention, the power supply apparatus further includes a feedback circuit. The feedback circuit is coupled to one of the first and the second rectifying and filtering circuits, in which the feedback circuit controls the operation of the power conversion circuit according to one of the first and the second output voltages, and the feedback circuit accordingly regulates the first and the second output voltages simultaneously.

According to an embodiment of the invention, the power conversion circuit includes a control chip and a pulse width modulation (PWM) circuit. The PWM circuit receives a direct current (DC) input voltage. Moreover, the PWM circuit is controlled by the control chip to switch and provide the DC input voltage to the primary winding.

According to an embodiment of the invention, the power supply apparatus further includes an electro-magnetic interference (EMI) filter circuit, a rectifying circuit, and a power factor correction (PFC) circuit. The EMI filter circuit receives an AC power source, and the EMI filter circuit is adapted for suppressing an electro-magnetic noise of the AC power source. The rectifying circuit is coupled to the EMI filter circuit to receive a noise suppressed AC power source, and the rectifying circuit rectifies the noise suppressed AC power source and accordingly generates a DC signal. The PFC circuit is coupled to the rectifying circuit to receive the DC signal. Moreover, the PFC circuit is controlled by the control chip to adjust a voltage-current phase relationship of the DC signal, thereby generating the DC input voltage for the PWM circuit.

According to an embodiment of the invention, the power supply apparatus further includes a voltage divider circuit coupled to one of the output terminals of the first and the second rectifying and filtering circuits.

According to an embodiment of the invention, the output terminal of the first rectifying and filtering circuit is coupled to a first load, and the output terminal of the second rectifying and filtering circuit is coupled to a second load. The power supply apparatus further includes a protection circuit. The protection circuit is coupled to the output terminals of the first and the second rectifying and filtering circuits. The protection circuit detects a power supply status of the first load and the second load, and determines whether to activate a power supply protection mechanism to terminate the operation of the power conversion circuit according to the detection result.

According to an embodiment of the invention, the power supply apparatus is based on a forward converter circuit.

In summary, embodiments of the invention provide a power supply apparatus utilizing a single transformer configuration to implement a power supply mechanism with multiple voltage outputs. At least one set of secondary winding and conjugate energy-storing inductor of the transformer is formed by winding triple insulated wire, and therefore the outputs of each group of the power supply apparatus can be effectively isolated from each other. Accordingly, the power generation/conversion efficiency of the entire power supply apparatus is enhanced without affecting output stability.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
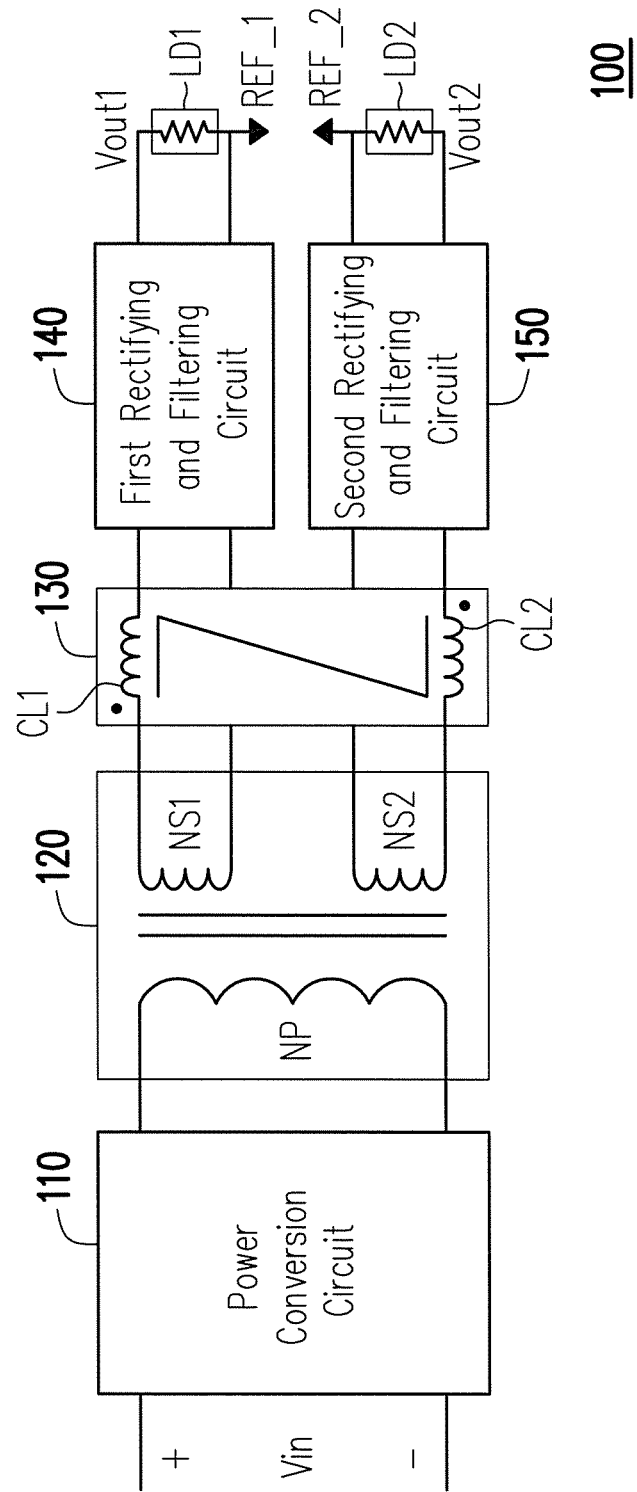
FIG. 1 is a schematic view of a power supply apparatus according to an embodiment of the invention.

The embodiments of the invention provide a power supply apparatus using a configuration of a single transformer and a single feedback circuit to implement a power supply mechanism with multiple voltage outputs. Accordingly, the circuit design costs are reduced and the power generation efficiency is enhanced. In order to make the invention more comprehensible, embodiments are described below as examples to demonstrate that the invention can actually be realized. Moreover, when possible, elements/components/steps with the same reference numerals represent the same or similar parts in the drawings and the embodiments.

FIG. 1 is a schematic view of a power supply apparatus according to an embodiment of the invention. Refer to FIG. 1, a power supply apparatus 100 includes a power conversion circuit 110, a transformer 120, a conjugate energy-storing inductor 130, a first rectifying and filtering circuit 140, and a second rectifying and filtering circuit 150. The power supply apparatus may be a power supply apparatus based on a forward converter circuit, for example.

The transformer 120 has a primary winding NP, a first secondary winding NS1, and a second secondary winding NS2. The conjugate energy-storing inductor 130 has a first conjugate coil CL1 and a second conjugate coil CL2 isolated from each other. The primary winding NP of the transformer 120 is coupled to the power conversion circuit 110. One terminal of the first conjugate coil CL1 and the second conjugate coil CL2 of the conjugate energy-storing inductor 130 are respectively coupled to the first secondary winding NS1 and the second secondary winding NS2. Moreover, the other terminal of the first conjugate coil CL1 and the second conjugate coil CL2 of the conjugate energy-storing inductor 130 are respectively coupled to an input terminal of the first rectifying and filtering circuit 140 and the second rectifying and filtering circuit 150. Furthermore, an output terminal of the first rectifying and filtering circuit 140 is coupled to a load LD1 to provide a first output voltage Vout1 (e.g. 12V) to the load LD1, and an output terminal of the second rectifying and filtering circuit 150 is coupled to a load LD2 to provide a second output voltage Vout2 (e.g. −53V) to the load LD2.

In the present embodiment, the power conversion circuit 110 outputs a direct current (DC) input voltage Vin to the primary winding NP of the transformer 120 in a switching manner, such that the first secondary winding NS1 and the second secondary winding NS2 respectively induce a corresponding voltage based on a voltage of the primary winding NP. The magnitude of the voltage induced by the first secondary winding NS1 is related to a turn ratio of the primary winding NP and the first secondary winding NS1, and the magnitude of the voltage induced by the second secondary winding NS2 is related to a turn ratio of the primary winding NP and the second secondary winding NS2. The first conjugate coil CL1 and the second conjugate coil CL2 respectively charges and discharges in response to the voltage induced by the first secondary winding NS1 and the second secondary winding NS2. The first rectifying and filtering circuit 140 and second rectifying and filtering circuit 150 respectively rectifies and filters the voltage generated by the charging and discharging of the first conjugate coil CL1 and the second conjugate coil CL2. Moreover, the first output voltage Vout1 is provided from the output terminal of the first rectifying and filtering circuit 140 to the first load LD1, and the second output voltage Vout2 is provided from the output terminal of the second rectifying and filtering circuit 150 to the second load LD2. To facilitate description, in the embodiments hereafter, the circuit constructed by the first secondary winding NS1, the first conjugate coil CL1, and the first rectifying and filtering circuit 140 is regarded as a "first output group", and the circuit constructed by the second secondary winding NS2, the second conjugate coil CL2, and the second rectifying and filtering circuit 150 is regarded as a "second output group".

Based on the afore-described circuit configuration and circuit operation flow, the power supply apparatus 100 of the present embodiment is capable of implementing a power supply mechanism in which the single transformer 120 is used to generate two sets of different output voltages Vout1 and Vout2. Compared to the conventional power supply configuration utilizing many transformers to respectively generate different output voltages, the power supply apparatus 100 of the present embodiment not only can reduce the overall circuit layout area of the entire power supply apparatus 100, but also lower the core loss of the power supply apparatus 100, and thereby enhancing the power generation/conversion efficiency.

In addition, under the configuration of the power supply apparatus 100, the designer merely needs to design a set of feedback circuit (not drawn, but described later in subsequent embodiments) to perform feedback control on the power conversion circuit 110 of the primary side according to one of the two output voltages Vout1 and Vout2. In other words, the present embodiment can achieve the function of simultaneously regulating two output voltages Vout1 and Vout2 by utilizing the mutual inductance of the conjugate energy-storing inductor bridged across each of the secondary windings NS1 and NS2. Furthermore, the power supply apparatus 100 of the present embodiment can also save the layout area of a set of feedback circuit compared to the conventional power supply apparatus. As a consequence, the performance of the overall power characteristics is enhanced.

On the other hand, in order to prevent multiple different output voltages generated by a single transformer from the issue of output isolation, the power supply apparatus 100 of the present embodiment adopts the following isolation schemes to avoid the output voltages Vout1 and Vout2 affecting each other: 1) Using insulated wiring to wind the secondary windings NS1 and NS2; 2) Using insulated wiring to wind the conjugate coils CL1 and CL2 of the conjugate energy-storing inductor 130; and 3) Respectively using the voltage levels of two electrically independent reference terminals to serve as the reference voltage levels of the first output group and the second output group.

Each of the isolation schemes is described in detail below. In the present embodiment, at least one of the first secondary winding NS1 and the second secondary winding NS2 of the transformer 120 may be formed by winding an insulated wiring material, in which the insulated wiring material may be a triple insulated wire, for example. In one exemplary embodiment, the designer may choose to wind the triple insulated wire into the first secondary winding NS1 or the second secondary winding NS2 according to the magnitude of the first output voltage Vout1 and the second output voltage Vout2 (in other words, according to the number of windings of the secondary windings NS1 and NS2). For example, if the first output voltage Vout1 is 12V and the second output voltage Vout2 is −53V, which means the number of windings of the first secondary winding NS1 is smaller than the second secondary winding NS2. Therefore, the designer may choose to wind the triple insulated wire into the first secondary winding NS1, and wind regular copper wire into the second secondary winding NS2. It should be noted that, based on a design requirement, the designer may also use the triple insulated wire to wind both the first secondary winding NS1 and the second secondary winding NS2, and the invention is not limited thereto.

On the other hand, in order to further enhance the isolation effect between the two output voltages, the conjugate energy-storing inductor 130 may also be made of an insulated wiring material. In other words, at least one of the first conjugate coil CL1 and the second conjugate coil CL2 of the conjugate energy-storing inductor 130 may be constructed by winding the insulated wiring material, so as to avoid the two conjugate coils CL1 and CL2 affecting each other.

Moreover, the first output group (the first secondary winding NS1, the first conjugate coil CL1, and the first rectifying and filtering circuit 140) and the second output group (the second secondary winding NS2, the second conjugate coil CL2, and the second rectifying and filtering circuit 150) respectively uses the voltage levels of different reference terminals REF1 and REF2 as the reference voltage level. The two reference terminals REF1 and REF2 are substantially electrically independent from each other (the two output groups do not have a common ground), and therefore the degree of isolation between the first output voltage Vout1 and the second output voltage Vout2 can be further increased.

Based on the afore-described isolation scheme, even if the power supply apparatus 100 of the present embodiment has only one transformer 120, the issue of mutual interference won't be a problem between the output voltages Vout1 and Vout2.

Figure 2:
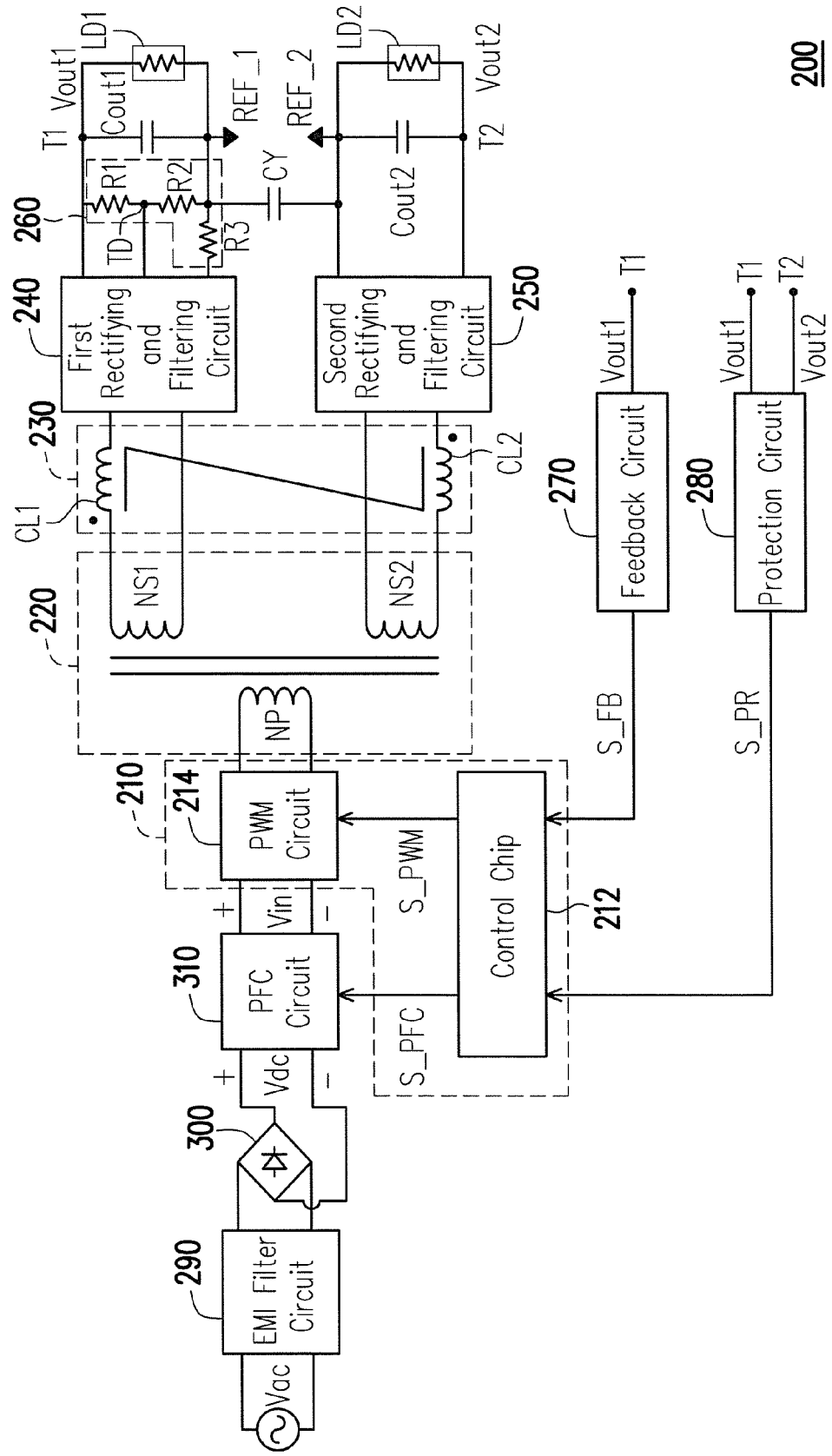
FIG. 2 is a schematic view of a power supply apparatus according to another embodiment of the invention.

In order to clearly describe embodiments of the invention, FIG. 2 is a schematic view of a power supply apparatus according to another embodiment of the invention. Refer to FIG. 2, besides a power conversion circuit 210, a transformer 220, a conjugate energy-storing inductor 230, a first rectifying and filtering circuit 240 and a second rectifying and filtering circuit 250, a power supply apparatus 200 further includes a voltage divider circuit 260, a feedback circuit 270, a protection circuit 280, an electro-magnetic interference (EMI) filter circuit 290, a rectifying circuit 300, and a power factor correction (PFC) circuit 310. The power conversion circuit 210 of the present embodiment may be implemented by a circuit configuration which has a control chip 212 and a pulse width modulation (PWM) circuit 214, although the invention is not limited thereto.

The configuration of the power conversion circuit 210, the transformer 220, the conjugate energy-storing inductor 230, the first rectifying and filtering circuit 240, and the second rectifying and filtering circuit 250 is similar to the embodiment depicted in FIG. 1. The EMI filter circuit 290, the rectifying circuit 300, and the PFC circuit 310 are coupled in sequence to a front stage of the power conversion circuit 210, so as to convert an alternating current (AC) power source Vac into a stable DC input voltage Vin and further providing to the power conversion circuit 210. Moreover, the voltage divider circuit 260 and the feedback circuit 270 may be coupled to an output terminal of the first rectifying and filtering circuit 240 in an example, although the invention is not limited thereto. In other words, the voltage divider circuit 260 and the feedback circuit 270 may be selectively coupled to one of the output terminals of the first rectifying and filtering circuit 240 and the second rectifying and filtering circuit 250 according to a design requirement from the designer.

In the present embodiment, the EMI filter circuit 290 is adapted for suppressing an electro-magnetic noise of the AC power source Vac, and to provide a noise suppressed AC power source to the rectifying circuit 300. The rectifying circuit 300 rectifies the noise suppressed AC power source and accordingly generates a DC signal Vdc. The PFC circuit 310 is coupled to an output of the rectifying circuit 300 to receive the DC signal Vdc. Moreover, the PFC circuit 310 adjusts a voltage-current phase relationship of the DC signal Vdc by being controlled by a control signal S_PFC provided by the control chip 212, and thereby generating the DC input voltage Vin to the PWM circuit 214. The PWM 214 is controlled by a control signal S_PWM provided by the control chip 212. Besides, the PWM 214 provides the DC input voltage Vin to the primary winding NP of the transformer 220 in a switching manner, such that the first output group and the second output group of the secondary side respectively sets the first output voltage Vout1 and the second output voltage Vout2 on the corresponding output capacitors Cout1 and Cout2. The output capacitor Cout1 is coupled between a node T1 (may be viewed as the output terminal of the first rectifying and filtering circuit 240) and a reference terminal REF_1. The output capacitor Cout2 is coupled between a node T2 (may be viewed as the output terminal of the second rectifying and filtering circuit 250) and a reference terminal REF_2.

An input terminal of the feedback circuit 270 is coupled to the node T1, and an output terminal of the feedback circuit 270 is coupled to the control chip 212. In the present embodiment, the feedback circuit 270 generates a feedback signal S_FB according to the first output voltage Vout1 for controlling the operation of the control chip 212 (e.g., regulating the signal frequency or enable period of the control signals S_PFC and S_PWM), and regulating the magnitudes of the first output voltage Vout1 and the second output voltage Vout2 simultaneously.

Specifically, when the control chip 212 adjusts the first output voltage Vout1 in response to the feedback signal S_FB, the second output voltage Vout2 change correspondingly due to the mutual inductance between the first conjugate coil CL1 and the second conjugate coil CL2. Based on this property, as long as one set of output voltages Vout1/Vout2 is stabilized at the rated voltage value, the other set of output voltages Vout1/Vout2 maintains the corresponding rated voltage value. Therefore, in the present embodiment, the power supply apparatus 200 only requires one set of feedback circuit 270 to implement the function of simultaneous feedback control of two sets of output voltages Vout1 and Vout2.

In addition, the voltage divider circuit 260 of the present embodiment is coupled to the resistors R1-R3 of the output terminal of the first rectifying and filtering circuit 240 as an example, which may be viewed as resistors connected in parallel with the output capacitor Cout1. The voltage divider circuit 260 may further reduce the voltage value of the first output voltage when the corresponding load LD1 is operating in heavy load. The voltage value of the second output voltage Vout2 is lowered by mutual inductance, such that each set of output voltage values (Vout1, Vout2) can be maintained within a normal/predetermined range. Due to the effect of the voltage divider circuit 260, the power supply apparatus 200 may effectively reduce the voltage shift of the first output voltage Vout1 and the second output voltage Vout2 when the two loads LD1 and LD2 are alternating between operating in heavy/light loads.

Moreover, in one exemplary embodiment, the first rectifying and filtering circuit 240/second rectifying and filtering circuit 250 corresponding to the voltage divider circuit (e.g. 260) may be implemented by a constant voltage control chip or a constant current control chip along with the corresponding external circuitry. Using the configuration illustrated in FIG. 2 as an example, if the first rectifying and filtering circuit 240 is implemented by the constant voltage/constant current control chip configuration, the drive stability of the load LD1 may be further maintained by detecting a voltage of a voltage dividing node TD (e.g., the common node of the resistors R1 and R2) of the voltage divider circuit 260 to serve as the basis for stabilizing voltage/current control.

The protection circuit 280 of the present embodiment may be a circuit formed by an over-voltage protection circuit, an under-voltage protection circuit, a short-circuit protection circuit, and/or an over-load protection circuit, for example. An input terminal of the protection circuit 280 is coupled to the nodes T1 and T2, and an output terminal of the protection circuit 280 is coupled to the control chip 212. The protection circuit 280 detects a power supply status of the loads LD1 and LD2 (e.g., the voltage and current actually received by the loads LD1 and LD2). Moreover, the protection circuit 280 controls the operation of the control chip 212 by generating a protection signal S_PR according to the detection result, so as to determine whether to activate a power supply protection mechanism to terminate the operation of the power conversion circuit 210 (e.g., stop generating the control signals S_PFC and S_PWM).

Besides the afore-described circuit units/components, the power supply apparatus 200 of the present embodiment may further include an AC safety capacitor CY (also regarded as a Y capacitor) coupled between the reference terminals REF_1 and REF_2 which can be shorted during high frequency operation for enhancing the isolating stability and lowering noise.

To sum up, embodiments of the invention provide a power supply apparatus utilizing a single transformer configuration to implement a power supply mechanism with multiple voltage outputs. At least one set of secondary winding and conjugate energy-storing inductor of the transformer is formed by winding triple insulated wire, and therefore the outputs of each group of the power supply apparatus can be effectively isolated from each other. Accordingly, the power generation efficiency of the entire power supply apparatus is enhanced without affecting output stability. Moreover, by utilizing the mutual inductance of the conjugate energy-storing inductor between each set of outputs, the power supply apparatus may also implement a feedback control mechanism simultaneously adjusting multiple sets of output voltages by using a single feedback circuit, and thereby effectively reducing the costs of the overall circuit design.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A power supply apparatus, comprising:
a power conversion circuit;
a single transformer having a primary winding, a first secondary winding, and a second secondary winding, wherein the primary winding is coupled to the power conversion circuit, and the first and second secondary windings respectively induce a corresponding voltage based on a voltage of the primary winding;
a conjugate energy-storing inductor having a first conjugate coil and a second conjugate coil isolated from each other, wherein the first conjugate coil is coupled to the first secondary winding, and the second conjugate coil is coupled to the second secondary winding; and
a first rectifying and filtering circuit and a second rectifying and filtering circuit respectively coupled to the first and the second conjugate coils, wherein the first and the second conjugate coils respectively charges and discharges in response to the voltage induced by the first and the second secondary windings, and thereby respectively provides a first output voltage and a second output voltage via the output terminals of the first and the second rectifying and filtering circuits,
wherein the first secondary winding and the first rectifying and filtering circuit use a voltage level of a first reference terminal as a first reference voltage level, and the second secondary winding and the second rectifying and filtering circuit use a voltage level of a second reference terminal as a second reference voltage level.

2. The power supply apparatus according to claim 1, wherein at least one of the first and the second secondary windings and the conjugate energy-storing inductor is formed by winding an insulated wiring material.

3. The power supply apparatus according to claim 2, wherein the insulated wiring material is a triple insulated wire.

4. The power supply apparatus according to claim 1, further comprising:
an alternating current (AC) safety capacitor coupled between the first reference terminal and the second reference terminal, wherein the first reference terminal and the second reference terminal are electrically independent from each other in low frequency.

5. The power supply apparatus according to claim 1, further comprising:
a single feedback circuit coupled to one of the first and the second rectifying and filtering circuits, wherein the feedback circuit controls the operation of the power conversion circuit according to one of the first and the second output voltages, and the feedback circuit accordingly regulates the first and the second output voltages simultaneously.

6. The power supply apparatus according to claim 5, wherein the power conversion circuit comprises:
   a control chip; and
   a pulse width modulation (PWM) circuit receiving a direct current (DC) input voltage, the PWM circuit being controlled by the control chip to switch and provide the DC input voltage to the primary winding.

7. The power supply apparatus according to claim 6, further comprising:
   an electro-magnetic interference (EMI) filter circuit receiving an AC power source, and the EMI filter circuit adapted for suppressing an electro-magnetic noise of the AC power source;
   a rectifying circuit coupled to the EMI filter circuit to receive a noise suppressed AC power source, the rectifying circuit rectifying the noise suppressed AC power source and accordingly generating a DC signal; and
   a power factor correction (PFC) circuit coupled to the rectifying circuit to receive the DC signal, the PFC circuit being controlled by the control chip to adjust a voltage-current phase relationship of the DC signal, and thereby generating the DC input voltage to the PWM circuit.

8. The power supply apparatus according to claim 1, further comprising:
   a voltage divider circuit coupled to one of the output terminals of the first and the second rectifying and filtering circuits.

9. The power supply apparatus according to claim 5, further comprising:
   a voltage divider circuit coupled to one of the output terminals of the first and the second rectifying and filtering circuits.

10. The power supply apparatus according to claim 1, wherein the output terminal of the first rectifying and filtering circuit is coupled to a first load, and the output terminal of the second rectifying and filtering circuit is coupled to a second load, the power supply apparatus further comprising:
    a protection circuit coupled to the output terminals of the first and the second rectifying and filtering circuits, the protection circuit detecting a power supply status of the first load and the second load, and determining whether to activate a power supply protection mechanism to terminate the operation of the power conversion circuit according to the detection result.

11. The power supply apparatus according to claim 1, wherein the power supply apparatus is based on a forward converter circuit.

* * * * *